June 29, 1965   J. E. DUFF ETAL   3,192,415
SYNCHRONOUS MOTOR WITH SELF-SET LIMIT CONTROL
Filed July 16, 1963

United States Patent Office 3,192,415
Patented June 29, 1965

3,192,415
SYNCHRONOUS MOTOR WITH SELF-SET
LIMIT CONTROL
Jack E. Duff, North Canton, Ohio, Donald W. Graves, Canoga Park, Calif., and Christian D. Berger, North Canton, Ohio, assignors to The Hoover Company, North Canton, Ohio, a corporation of Ohio
Filed July 16, 1963, Ser. No. 295,360
12 Claims. (Cl. 310—8.3)

The present invention relates in general to small, very low power synchronous electric motors of the type in which an electrically energized element of the type which vibrates synchronously with the frequency of the applied energizing alternating current drives a light pawl in engagement with a ratchet wheel forming the power train of the motor.

In particular the present invention is concerned with a device which automatically limits the extent of the excursion of the pawl to an amount greater than the pitch of one tooth on the ratchet and less than the pitch of two teeth on the ratchet regardless of variations in the power unit of the system which may be induced by changes in line voltage, temperature, tolerance buildup, aging, load changes or variations between individual power elements.

The present invention is further particularly concerned with the device of the above described character which requires no factory adjustment and which continuously operates to self-adjust itself to maintain the pawl excursion wtihin prescribed limits regardless of changes which may occur in the system.

Our present invention is related to application Serial No. 295,464, filed July 16, 1963, entitled "Electro-Thermal Motor"; to application Serial No. 295,423, filed July 16, 1963, entitled "Synchronous Electric Motor"; to application Serial No. 295,463, filed July 16, 1963, entitled "Improvements In Synchronous Electric Motor"; to application Serial No. 295,359, filed July 16, 1963, entitled "Synchronous Motor With Limit Control"; and to application Serial No. 295,424, filed July 16, 1963, entitled "Synchronous Motor And Mounting." All of these applications are assigned to the same assignee as the present application. The present invention is concerned explicitly with the automatic continuously acting self-adjusting stop mechanism for the vibratory motor to be described hereinafter.

Figure 3:
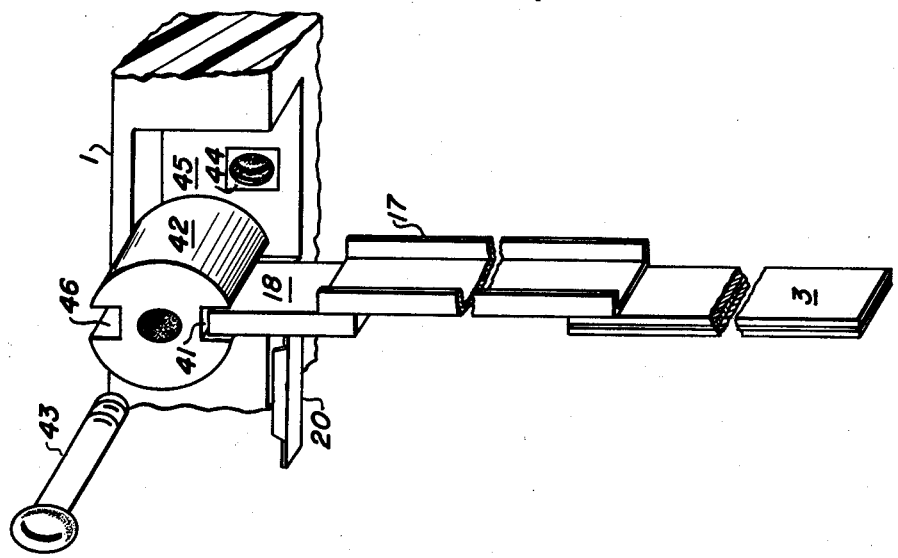
Figure 1:
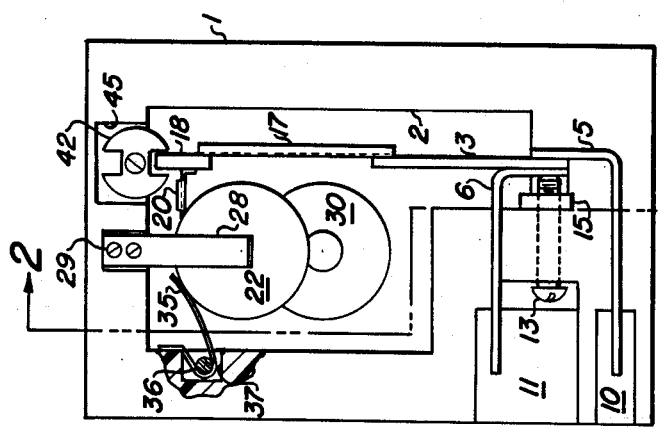
Figure 2:
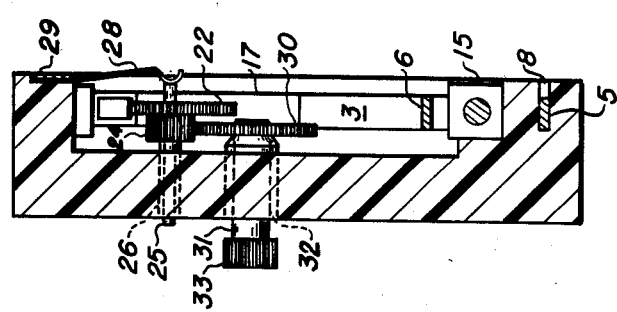

Other and further objects and advantages of our invention will become apparent as the description proceeds when taken in connection with the accompanying drawing wherein:

FIG. 1 is an elevational plan view of a piezo-electric type motor embodying our invention, FIG. 2 is an elevational sectional view taken along the line 2—2 of FIG. 1 and looking in the direction of the arrows, and FIG. 3 is a greatly enlarged scale perspective view illustrating a portion of the mechanism comprised in the motor of FIGS. 1 and 2.

Referring now to the drawing, the apparatus is entirely mounted and housed by a frame or casing 1 which is preferably a plastic molding having a central molded-in recess 2 within which the mechanical parts of the motor are mounted.

The driving element of our electric motor is a piezo-electric element 3, the active material of which may be any suitable piezoelectric material such as Rochelle salt, barium titanate or lead zirconate titanate. Preferably the element 3 is of the multi-layer sandwich type, as shown more clearly in FIG. 3, consisting of a thin brass strip having the piezoelectric material adhered to the opposite faces thereof. The exposed faces of the piezoelectric material are then silvered in order to provide for electrical contact thereto. The piezoelectric element in a preferred form of out invention is a bender type and consists of a strip of approximately ⅞ inch in length, the lower ⅛ inch of which is secured and clamped by a pair of electrical conductors. As illustrated herein the lower end of the piezoelectric element 3 extends between the bent end portions of a pair of L-shaped securing and electrical conductor bars 5 and 6 which engage the opposite silvered outer surfaces of the element 3.

The conductor bar 5 is mounted in a molded slot 8 formed in the casing 1 to accommodate the same. The leg of the L extends into an extension of recess 2 at the lower part thereof which forms a mounting region for the element 3 and conductor bars 5 and 6. The free end of conductor bar 5 extends into a recess 10 molded in casing 1 to provide space for an electric plug or connection to bar 5.

Conductor bar 6 has its bent end portion engaging one face of element 3 and is mounted in a slot similar to slot 8 passing through that portion of casing 1 which separates the recess 2 from another large size recess 11 for purpose to be described hereinafter. The end of conductor bar 6 which projects into recess 11 is free for electrical connection thereto.

Elements 3, 5 and 6 are clamped together and secured in the downward extension of recess 2 by means of a stud 13, the head portion of which is accessible through the large recess 11. Stud 13 is threaded through a captive nut 15 which is secured in a complementally shaped portion of the bottom of recess 2. Driving the stud 13 inwardly through the captive nut 15 jams elements 3, 5 and 6 together and against a wall of recess 2 as shown in FIG. 2 providing a firm mechanical anchorage for all of them and insuring good electrical contact between the conductor bars 5 and 6 and the opposite silvered external surfaces of the piezoelectric element 3.

A rigid extender element 17 in the form of a thin section, light weight channel shaped stainless steel member is cemented to the top eighth inch of the member 3 and has its outer end carrying a projecting block of rubber or similar flexible sound deadening and resilient material 18. The rubber or rubber-like block 18 is secured to member 17 by cementing.

A small light weight pawl 20, preferably of stainless steel, has a bent end portion, as shown in FIG. 1, which is cemented to the face of the rubber-like block 18 opposite to the face thereof cemented to the extender member 17. The pawl 20 engages the peripheral teeth on a small fine toothed ratchet wheel 22. The pawl is so mounted on the block 18 that it is pressed lightly against the periphery of the wheel 22 by its own springiness.

The ratchet wheel 22 is made effectively and inexpensively by molding the same from a suitable plastic. In a preferred embodiment of the invention the wheel 22 is a molded plastic having a mass of less than one gram, a diameter of one-half inch and 250 teeth molded into its periphery whereby each tooth has a pitch slightly in excess of six thousandths of an inch. It will be understood that the pitch of one tooth is used to describe the pitch of the teeth on ratchet wheel 22 and the pitch of two teeth is the same as two times the pitch of the teeth on the ratchet wheel. The ratchet wheel 22 and an associated small spur gear 24 are each press fitted upon a spindle 25 which is journaled in a bushing 26 press fitted in the casing 1 as shown most clearly in FIG. 2. The end of the shaft 25 projecting through the wheel 22 has its outer end engaged by a light weight leaf spring 28 secured to casing 1 by suitable screws 29. The function of the spring 28 is to maintain a light axial pressure on the spindle 25 to maintain the end face of gear wheel 24 in engagement with the inner end face of the bushing 26 to insure proper axial positioning of these parts in the apparatus.

The small gear wheel 24 meshes with a larger diameter spur gear 30 press fitted on a shaft 31 which is journaled in a bushing 32 pressed into casing 1. The outer end of shaft 31 carries a small spur gear 33 which forms the actual power offtake element of the electric motor and which may be connected to any suitable low level load requiring synchronous operation such as an electric clock mechanism.

The peripheral surface of the ratchet wheel 22 is also engaged by small light weight leaf spring 35 wrapped around a pin 36 which extends across a recess 37 molded into the body of the casing 1. The function of the spring 35 is to exert a light pressure on the periphery of wheel 22 to insure that the same comes to a complete stop immediately following each driving stroke of the pawl 20 and also to prevent reverse rotation of wheel 22 during the return stroke of the pawl 20 when the end thereof is dragging across the inclined flank of the ratchet tooth. As brought out more fully in the above identified application Serial No. 295,464, filed July 16, 1963, the spring 35 should contact the wheel 22 as closely as possible to the point at which the pawl 20 contacts it and in all events within an angle of 90°.

That portion of the rubber-like block 18 which projects above the pawl 20 extends into a slot 41 which is formed in, and extends longitudinally parallel to the axis of, a cylindrical solid metal limit stop member 42. The stop member 42 is pivotally mounted on a pintle pin 43 which has its threaded end secured in the housing 1 in any suitable manner. The pintle 43 may, for example, thread into an insert 44, shown in FIG. 3, which is molded or pressed into the casing 1. The recess 2 is enlarged as shown at 45 directly above the pawl driving mechanism in order to receive the stop member 42.

The recesses 2, 10, 11 and 45 and the slots receiving the bars 5 and 6 are all molded into casing 1 and open through the right-hand face thereof as viewed in FIG. 2. This construction allows all the parts, except stud 13, to be inserted and assembled from one side of the casing. The parts are all visible and accessible as the stud 13 is seated. Gear 33 is of smaller diameter than the bore in the casing which receives bushing 32.

A balancing slot 46 is formed in the member 42 directly opposite to and identical with the slot 41 so as to insure that the member 42 has complete balance in any position about the pin 43.

The member 42 is preferably a solid metal member having the slots 41 and 46 machined therein though other means of producing this element may be followed within the scope of the present invention.

The total clearance between each stop or contact surface of the member 42, provided by the facing side walls of slot 41, and each corresponding oppositely facing contact wall of the rubber block 18 must be greater than the pitch of single tooth on the wheel 22 and less than the pitch of two teeth thereon. In the example given, the foregoing dimension lies between six and twelve thousandths of an inch and is ideally designed to be approximately nine thousandths of an inch, thus allowing a reasonable clearance on these parts with assurance that clearances and tolerances at this point will not interfere with the proper operation of the pawl 20, ratchet wheel 22 combination.

The mass of the inertia stop member 42 should be large compared to the mass of the vibrating system 3, 17, 18 and 20. We have found that a mass ratio of 10 to 1 or greater is best suited as a practical matter for the above specified parts. Thus, in the example given, the member 42 should have a mass of approximately 4 grams.

When the device is operating the electrically induced vibration of member 3 and the parts carried thereon causes member 18 to vibrate in the slot 41 whereby the opposite faces of member 18 alternately strike the adjacent contact surfaces in the slot 41. The mass of member 42 being very high relative to the mass of the vibrating system the blows applied to the contact faces of slot 41 by the extending part of member 18 sharply limit the amplitude of vibration of pawl 20 since the force of a single blow is unable to impart significant movement to the heavy member 42 about the pintle pin 43. Normally the frequency of vibration of the vibrating system will be 50 to 60 cycles per second depending upon the frequency of the line current which is supplied in a particular area.

The member 42 assumes an adjusted position suitable for all the conditions obtaining at a particular moment while limiting the amplitude of motion of the pawl 20 to an amount greater than the pitch of one tooth and less than the pitch of two teeth on wheel 22. The member 42 moves slightly in response to each impact imparted thereto by member 18 but as the impacts are in opposite directions the net result is a minute amplitude oscillation of member 42 about pin 43 without changing its average position in any respect. It will be understood that the stop could be made so that it would limit the amplitude of motion of pawl 20 to an amount greater than the pitch of two teeth and less than the pitch of three teeth. Within a practical limit the amplitude of the pawl can be limited to an amount greater than the pitch of a given number of teeth and less than the pitch of the next higher number of teeth.

Under conditions of minimum line voltage it is possible that neither face of slot 41 will be contacted by the member 18. It is also possible under such conditions that bare contact will be made between the member 18 and only one face of slot 41. The foregoing conditions are not objectionable as the design should be such that all piezoelectric devices within the tolerances set therefor will provide a pawl excursion greater than one tooth on the ratchet wheel under the minimum line voltage expected to be encountered in use.

Under conditions of maximum line voltage to be expected in use the excursion of the pawl is still held within acceptable limits though the arc through which the limit stop member is oscillated will be increased. As voltage increases the first high impact tends to swing the impacted face of slot 41 a greater than normal distance in the direction of movement of the pawl, but this also brings the other face of the slot a greater distance in the same direction with the result that such other face of slot 41 is contacted earlier in time than previously resulting in a longer duration of push on the limit stop and of load on the driver element. Conditions are possible in which the members 18 and 42 are moving in opposite directions at the moment of contact. Subsequent to the movement of the member 42 to approximate adjusted position, each impact of the block 18 will not move member 42 more than about 10% of one tooth pitch.

In consequence of the foregoing no significant variation in pawl excursion occurs between maximum and minimum line voltage conditions. The variant factors are the stress in the driver, the degree of movement of the limit stop and the energy to be dissipated by the system.

Assuming that member 42 has been shifted out of its proper adjusted position, as by shipping, handling or the like, it is almost immediately moved to its adjusted position upon energization of member 3. This movement to adjusted position is accomplished very quickly because the force of the impacts imparted by member 18 will be much greater on one contact face of slot 41 than the other and will thus impart a net movement to the member 42 in a direction to decrease the impact imparted to the surface receiving the stronger blows and to increase the impact on the contact surface receiving the lighter blows. Such adjustment of member 42 automatically occurs in a fraction of a second which is a time period too short to have any significant effect upon the operation of the motor as a prime mover.

Some piezoelectric devices, particularly the single layer type, are affected by changes in temperature resulting in a slight deflection in one direction or the other. Obviously such deflection will be reflected in the static position of member 18, that is the position which that member assumes when member 3 is not energized. Any change in the static position of member 3 results in a change of the center about which it oscillates and produces a change in the ideal position of the contact faces in slot 41. The present invention automatically compensates for this immediately as inequality of impact on opposite contact faces of member 42 momentarily results until member 42 shifts its position to assume a new adjusted position which is suited to the temperature condition then prevailing.

Factors other than temperature and line potential are also automatically compensated by our invention. For example, not all the piezoelectric elements in any given production run will be perfectly identical with each other or even perfectly flat. Such deviations are of no significance using our inertia stop as each stop automatically assumes a correct position for the particular vibrating system with which it is operating without the necessity for a factory or other adjustment. Changes in the geometry of member 3 and its associated parts due to aging, wear and the like are similarly automatically compensated.

It will be noted that the provision of dual identical slots 180° apart on member 42 produces a balanced structure. Consequently, a piezoelectric motor embodying our invention operates reliably in any position.

Member 42 can be made in other shapes than that shown and slot 46 can be eliminated if desired. However, in order to operate equally reliably in any orientation of the motor, pintle 43 should pass through the center of gravity of member 42 so that the latter is statically balanced. Thus, in the case of a cylindrically shaped member 42 having no slot 46, the pintle 43 should be eccentric to the periphery of member 42 in a direction away from slot 41.

When the motor is operating the system 3, 17, 18 and 20 is subject to load on the driving stroke of the pawl; hence, the block 18 moves slower on the driving stroke than on the non-driving stroke. Consequently, the member 42 is shifted to an adjusted (equilibrium) position in which it oscillates slightly about a point displaced from the point about which block 18 oscillates in the direction of the non-driving stroke of the pawl. The magnitude of this displacement is very small at all events and increases and decreases as the load on the motor is increased and decreased. In any case the member 42 is self-regulating in that it automatically shifts to a new adjusted position in response to changes in load or other conditions affecting the system.

Our present invention is of great practical value in that it is inexpensive, simple and reliable in operation, eliminates all need for factory adjustment of the device, is unaffected by shipping and handling or operating position of the motor and almost instantaneously compensates the system for variations in line voltage, temperature, changes in the resistance of the load and other factors which may alter the ideal neutral position of the vibrating system and at the same time effectively controls the amplitude of the stroke of the pawl rigidly within the desired operating limits.

We claim:

1. A synchronous electric motor having a frame, a ratchet wheel pivotally supported by the frame, a pawl engaging said ratchet wheel, a prime mover of the type which vibrates synchronously with the frequency of an applied energizing alternating current drivingly coupled to said pawl to drive said ratchet wheel, and mechanism for controlling the amplitude of motion of said pawl comprising a stop member movably mounted on said frame and having a pair of oppositely facing stop faces, means movable with said pawl having a pair of oppositely facing contact surfaces each positioned to move toward and away from a separate one of said stop faces as said prime mover vibrates, the clearances between said stop faces and contact surfaces being sufficient to allow movement of said pawl greater than the pitch of a single tooth and less than two teeth on said ratchet wheel without interference by said stop member, the mass of said stop member being sufficient to arrest motion of said pawl on contact between a stop face and a contact surface with insignificant motion of said stop member.

2. Apparatus according to claim 1 wherein said stop member is in the form of a cylindrical body rotatably supported by said frame, a slot is formed in said body the opposing side walls of which form said contact surfaces and a like balancing slot is formed in said body 180° from said first slot.

3. In a synchronous electric motor having a frame, a fine toothed ratchet wheel rotatably supported on the frame, a pawl operatively engaging the ratchet wheel, a drive means on the frame of the type which vibrates synchronously with the frequency of an energizing alternating current drivingly coupled to the pawl, characterized by the provision of a self-adjusting limit stop mechanism comprising a stop member movably supported by the frame and having a pair of limit stop faces, a part on said drive means having a pair of contact surfaces each positioned to be moved toward and away from a separate one of said stop faces when said drive means is energized, the stop faces and contact surfaces being positioned to allow movement of said pawl by an amount greater than one and less than two teeth on said ratchet wheel, said stop member having a mass such that said part will not move it more than about 10% of the pitch of a single tooth on said ratchet wheel in response to a single impact by said part when said member is approximately in adjusted position.

4. A synchronous electric motor comprising a frame, a ratchet wheel rotatably supported by said frame, a drive mechanism for said ratchet wheel including a pawl engaging the teeth on said ratchet wheel and a drive means of the type which vibrates synchronously with the frequency of an energizing alternating current, a limit stop mechanism including a stop member, contact surfaces on said stop member and said driving mechanism positioned to engage each other to limit the travel of said pawl to a distance greater than the pitch of one tooth on said wheel and less than two teeth on said wheel, said limit stop being movably mounted on said frame to be free to move in opposite directions when the contact surfaces on the stop and driving member engage and having a mass such that the motion imparted thereto by a single engagement is only a limited fraction of the pitch of a single tooth on said ratchet wheel.

5. A synchronous electric motor comprising a frame, a ratchet wheel rotatably supported by the frame, driving mechanism for rotating the ratchet wheel including a pawl engaging the ratchet wheel and a vibratory driver for the pawl of the type which vibrates synchronously with the frequency of an energizing alternating current, a self-adjusting limit stop mechanism for limiting the excursion of the pawl to a distance which is less than the pitch of two teeth on the ratchet wheel comprising a pair of oppositely facing spaced stop surfaces carried by a member movably mounted on the frame, a pair of spaced stop surfaces on said driving mechanism each positioned to move toward an oppositely facing stop surface on said member as said pawl is reciprocated, said stop surfaces being spaced to allow an unimpeded excursion of said pawl greater than the pitch of one tooth and less than the pitch of two teeth on said ratchet wheel, said member having a mass sufficient to prevent motion of said pawl exceeding the pitch of two teeth on said ratchet wheel.

6. Apparatus according to claim 5 wherein said driver is a piezoelectric member.

7. Apparatus according to claim 5 wherein said member is a cylinder mounted to rotate about its longitudinal axis and is provided with identical longitudinal slots positioned on opposite sides thereof, and the stop surfaces on said driving mechanism are the opposite sides of a resilient member which projects into one of said slots.

8. Apparatus according to claim 5 wherein said resilient member is made of a sound absorbing rubber-like material.

9. Apparatus according to claim 5 wherein the mass of said stop member exceeds about ten times the mass of the moving parts of said drive mechanism.

10. Apparatus according to claim 5 wherein one pair of said stop surfaces comprises the facing side walls of a slot and the other pair of said stop surfaces comprises the opposite sides of a plate-like member extending into the space between said first pair of stop surfaces.

11. Apparatus according to claim 5 wherein one pair of said stop surfaces is of rubber-like material.

12. Apparatus according to claim 5 wherein said limit stop is mounted to oscillate on an axis passing through its center of gravity.

References Cited by the Examiner

Piezo-Electricity, pages 673–674, by W. G. Cady. Published by McGraw-Hill Company, 1946.

MILTON O. HIRSHFIELD, *Primary Examiner.*